Aug. 2, 1960     H. S. ROCKWELL     2,947,118
GRAIN STORAGE STRUCTURES
Filed Sept. 6, 1956     4 Sheets-Sheet 2
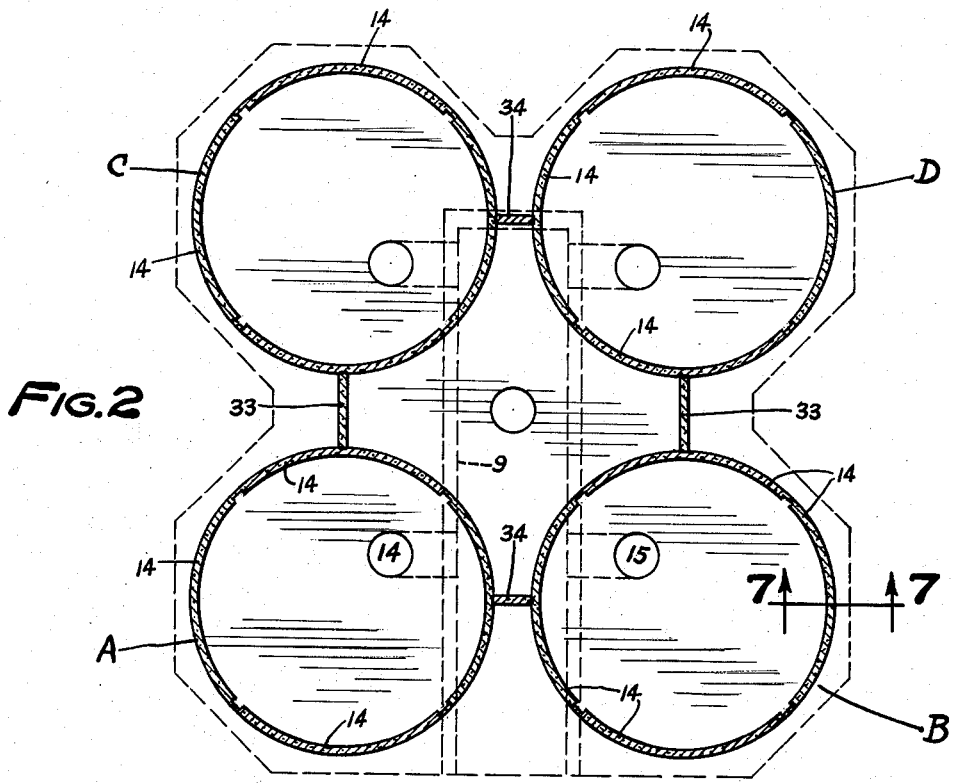
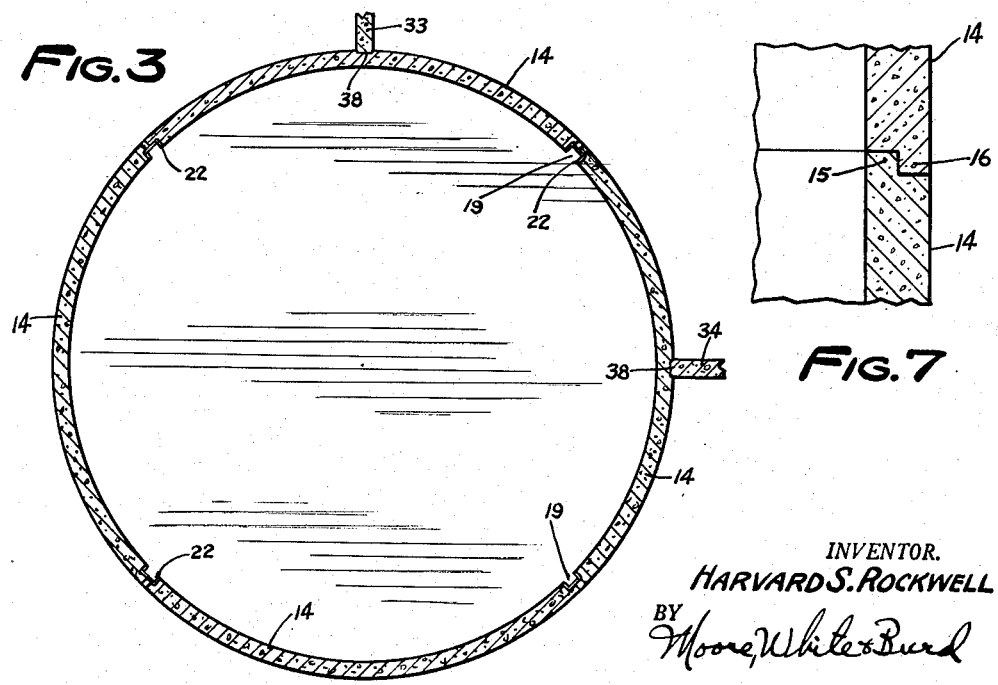
INVENTOR.
HARVARD S. ROCKWELL
BY
*Moore, White & Burd*
ATTORNEYS

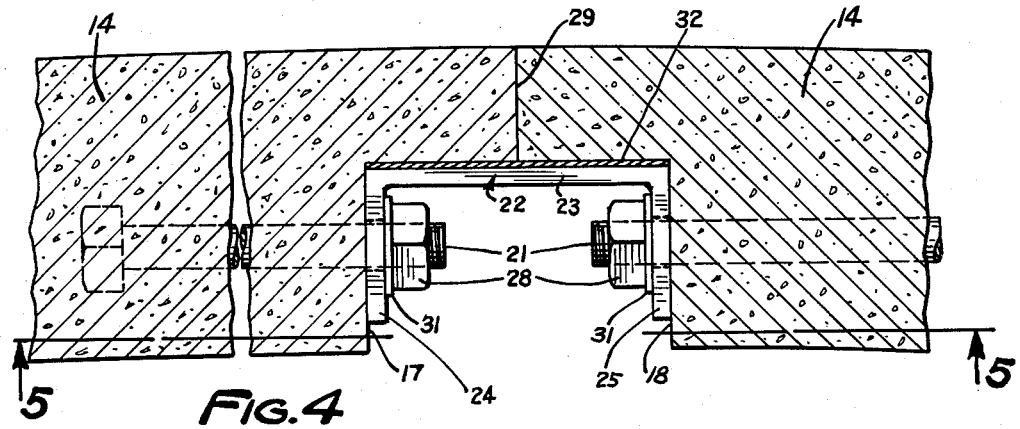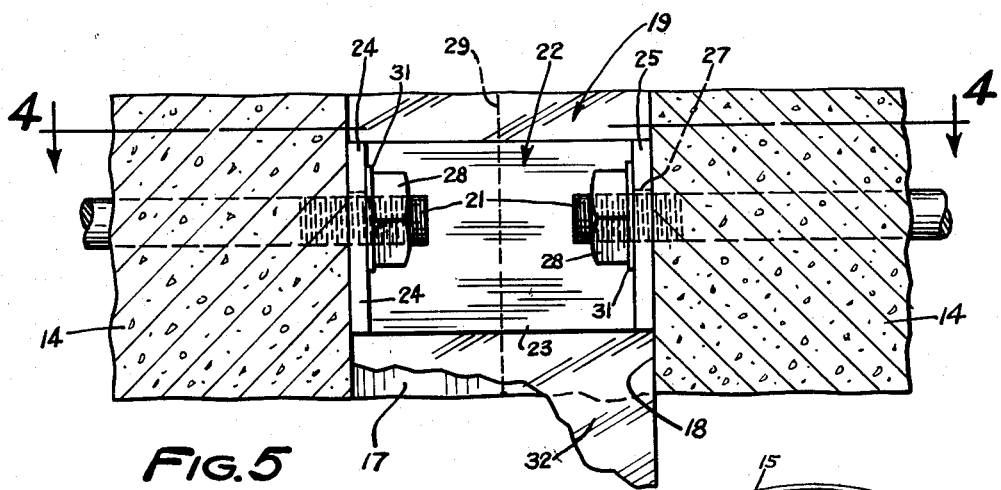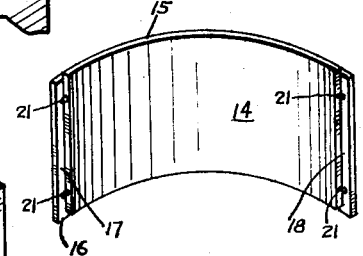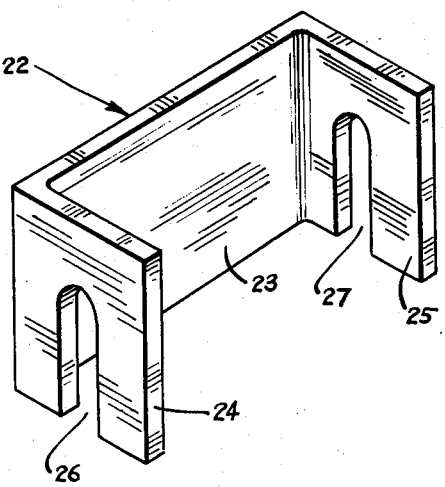

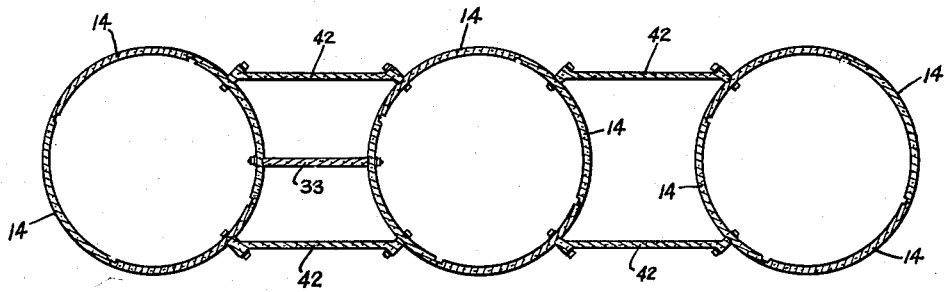
FIG. 9
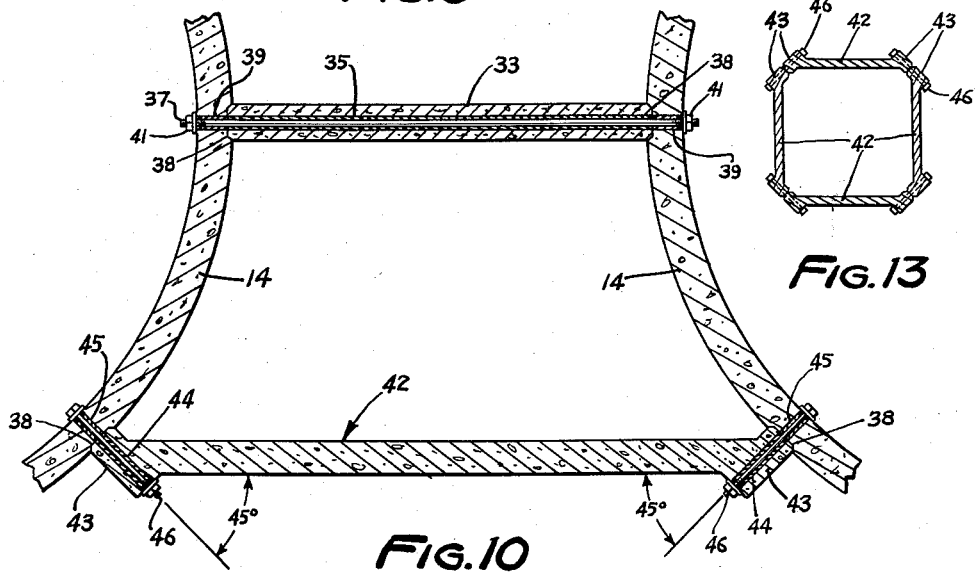
FIG. 10
FIG. 13
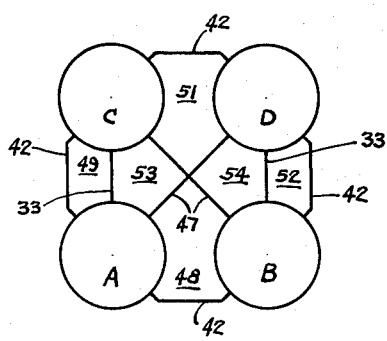
FIG. 12
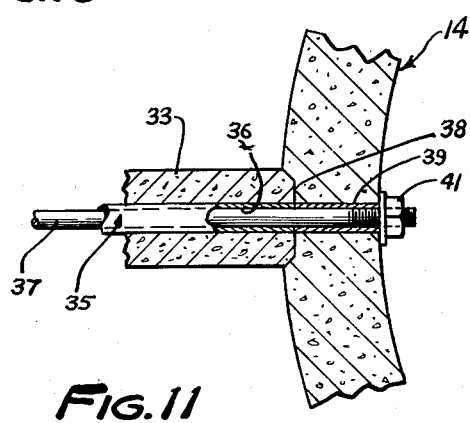
FIG. 11
INVENTOR.
HARVARD S. ROCKWELL

United States Patent Office 2,947,118
Patented Aug. 2, 1960

2,947,118

GRAIN STORAGE STRUCTURES

Harvard S. Rockwell, 1635 W. 26th St., Minneapolis, Minn.

Filed Sept. 6, 1956, Ser. No. 608,245

2 Claims. (Cl. 50—202)

This invention relates to new and useful improvements in grain storage structures, generally, and more particularly to the construction of concrete tanks or bins such as used at grain terminals and elevators for storing large quantities of bulk grain.

Concrete grain storage tanks or bins are not broadly new, as such bins have been used in the trade for a period of years, to the best of my knowledge, none of these structures have proven entirely satisfactory, largely because such structures have heretofore been constructed on the job of freshly poured concrete, requiring the erection of costly forms, and the subsequent dismantling of such forms after the concrete has become set. The walls of storage tanks or bins of large capacity are subjected to extremely high outward pressures, and therefore must be adequately reinforced to resist such pressures. Tanks of cylindrical cross-section have proven most popular in the trade for the storage of large quantities of bulk grain, and numerous attempts have therefore been made in the past to provide such a structure which would adequately meet all the requirements of the trade, including the initial cost of erection.

Some experimental tanks have been made of boiler plate. In such structures the tank walls are constructed of a plurality of segmental wall sections having their marginal edge portions secured together by bolts, rivets, or other suitable securing means. Steel tanks are subject to rapid deterioration by the elements and hence are short lived.

Such tanks therefore, have not proven very popular in the trade because of high maintenance costs. Cylindrical grain storage tanks having concrete walls have also been constructed on the job by the use of suitable forms into which the fresh bulk concrete is poured to form the walls, from the bottom to the top of the structure. Such construction, as hereinbefore stated, is extremely laborious, and costly.

It is therefore an important object of the present invention to provide an improved concrete grain storage bin or tank constructed entirely of a plurality of pre-cast concrete slabs or wall sections, which, in a cylindrical tank, are segmental in form or cross-section, and means being provided at the vertical end edges of said slabs for securing said edges together in leaktight relation, whereby moisture can not enter the tank through the vertical joints between adjacent wall sections.

A further and more specific object of the invention resides in the novel construction of the means provided for connecting together the vertical edges of adjacent sections, which means comprises a plurality of U-shaped clips or coupling elements having means therein adapted to interlock with fastening elements secured in the marginal edges of the slabs, whereby the contiguous edges of adjacent slabs may be secured together in leak-tight relation in a very efficient and expeditious manner.

A further object of the invention is to provide in combination with a group of cylindrical grain storage bins or tanks arranged in a group of means whereby the spaces provided between the peripheries of such tanks may be converted into additional grain storage bins, the means provided for thus converting the spaces between such tanks for additional grain storage comprises a plurality of pre-cast slabs having their opposed marginal edges adapted to be received in longitudinally extending recesses provided in the exterior surfaces of the cylindrical tank slabs.

Other objects of the invention reside in the specific construction of the means provided for securing the vertical edges of the auxiliary flat slabs to the peripheries of the cylindrical walls of adjacent tanks whereby they become, in effect, an integral part of the composite tank structure; in the provision of additional flat slabs having their upright marginal edges disposed at an angle to the plane of the slab, thereby to facilitate securing said slabs to the tank walls by suitable anchor bolts, whereby the connections between the auxiliary flat wall slabs may be drawn tightly into engagement with the peripheries of their respective tank walls to provide leak proof joints therebetween; in the unique construction of the coupling elements or clips utilized for securing together the contiguous edges of adjacent segmental wall sections, which clips are substantially U-shaped in cross-section, and have open ended slots in the spaced parallel legs or flanges thereof adapted to receive the threaded terminals of anchor bolts embedded in the wall segments, said coupling elements being received in longitudinally extending recesses provided on the interior surfaces of the wall segments; and in provision of suitable flashings for sealing the joints between adjacent slab edges.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follows.

In the drawings:

Figure 2 is a sectional plan view on the line 2—2 of Figure 1;

Figure 3 is a sectional plan view of one of the tank units, on a relatively larger scale, to more clearly illustrate the connections between adjacent wall sections or segments;

Figure 4 is a detail sectional view on the line 4—4 of Figure 5, showing a coupling element operatively engaged with the anchor bolts provided in the upright end edges of adjacent wall sections;

Figure 5 is a section view on the line 5—5 of Figure 4;

Figure 6 is a perspective view of one of the tank sections detached from the structure;

Figure 7 is an enlarged detail sectional view on the line 7—7 of Figure 2, showing the interlocking arrangement of the top and bottom edges of the segmental wall sections to provide leak proof joints therebetween;

Figure 8 is a perspective view of one of the coupling elements showing the open ended slots in the spaced parallel flanges or walls thereof;

Figure 9 is a plan view of an installation showing three tank units arranged in a row with auxiliary wall elements secured thereto to provide additional grain storage bins between the peripheries of said tanks;

Figure 10 is an enlarged detail sectional view showing the method of securing the auxiliary wall elements to the peripheries of the cylindrical tank units;

Figure 11 is an enlarged fragmentary view showing a tubular element embodied in an auxiliary wall element for receiving the tie rods or bolts for securing said elements to the tank walls;

Figure 1:
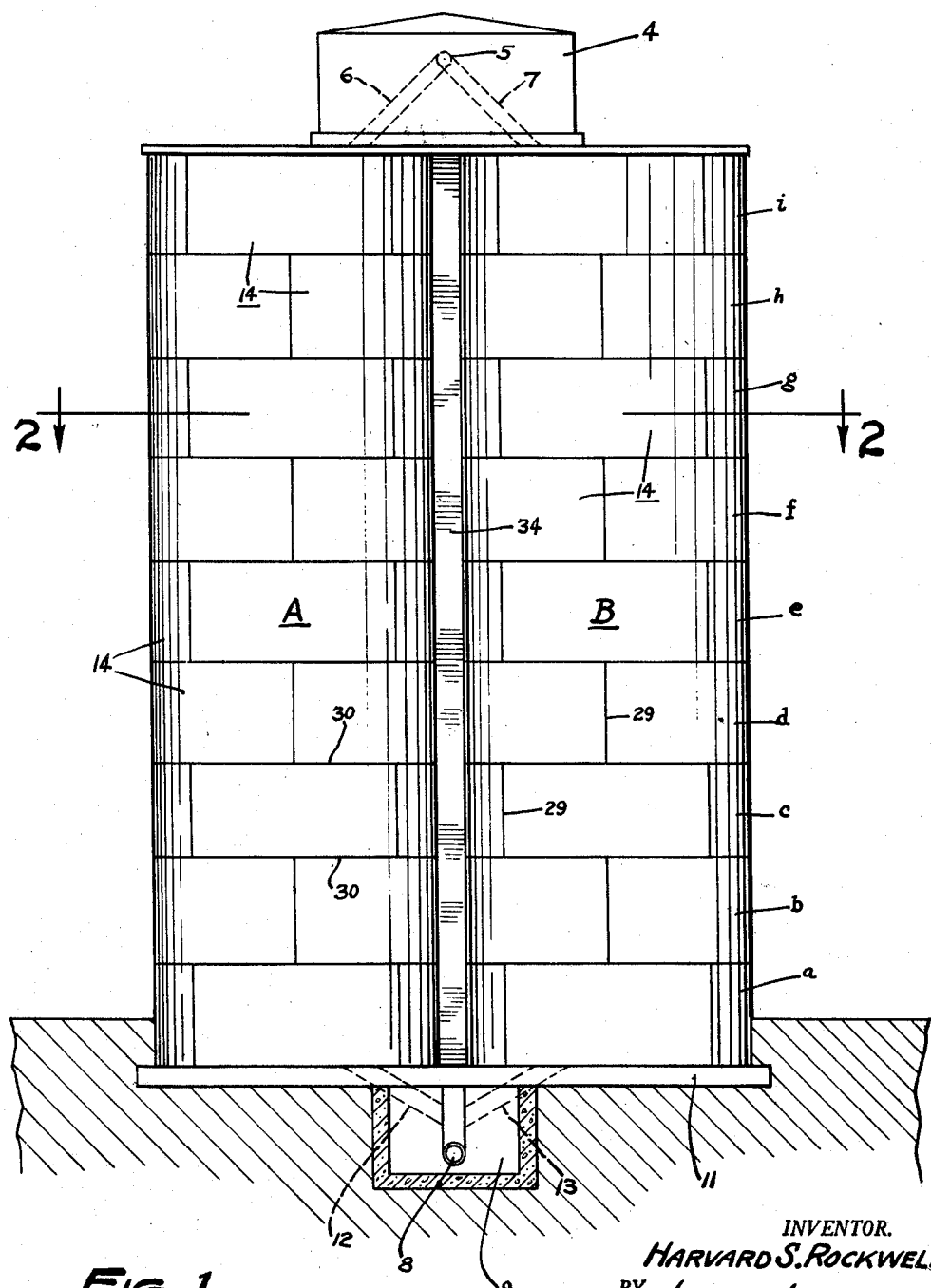
Figure 1 is an elevational view of a multiple grain storage structure embodying the invention herein disclosed.

Figure 12 is a diagrammatic view showing how a plurality of relatively smaller grain storage bins may be provided between a group of cylindrical tank units by the provision therebetween of the auxiliary wall elements shown in Figures 9 and 10; and Figure 13 is a sectional plan view, on a reduced scale, of a grain bin composed of a plurality of flat slabs secured together at the corners of the structure by bolts.

In the selected embodiment of the invention herein disclosed, there is illustrated in Figures 1 and 2, for purposes of disclosure, grain storage structure comprising a plurality of cylindrical tank units, generally designated by the reference characters A, B, C and D. Tank units A, B, C and D are shown arranged in rectangular formation with their walls spaced apart as indicated at 2 and 3 in Figure 2. Obviously, the tank units may be otherwise arranged or grouped without departing from the scope of the invention.

The composite grain storage structure or building illustrated in Figure 1, is shown provided with the usual superstructure or roof 4, in which is located the usual delivery conveyor 5 and branch conduits 6 and 7 for delivering grain into the upper ends of the tank units, as is well known in the art. Means, not shown, is provided for elevating the grain to the delivery conveyor 5.

A conventional screw type conveyor 8 is provided in the chamber 9 below the foundation 11 of the composite structure, as illustrated in Figure 1. Delivery conduits 12 and 13 connect the discharge openings 14 and 15, respectively, of the tank units to the screw conveyor 8 in the usual manner. Suitable shut-off gates, not shown, are provided in conduits 12 and 13 for controlling the flow of grain from the tank units to the screw conveyor 8. The conveyor system above described is of well known construction, and therefore need not be further described herein.

An important feature of the present invention resides in the unique construction of the segmental wall sections of the cylindrical tank units A, B, C and D. As best illustrated in Figures 1 and 3, the cylindrical wall of each tank unit is constructed of a plurality of pre-cast concrete slabs, generally designated by the numeral 14. The wall sections or slabs 14 are in the form of segments, and four such sections may be utilized to complete each course of wall sections as best illustrated in Figure 3. In Figure 1, the cylindrical tank units A, B, C and D are each shown comprising nine courses of wall sections, indicated by the reference characters *a* to *i*, inclusive. Obviously the number of segments employed to complete each course may be varied, as desired, depending upon the diameter and size of the structure, and in like manner, the number of courses of wall sections in a given structure may be varied in accordance with the height of the structure.

Another important feature of the present invention resides in the construction of the upright vertical end edges of each segmental wall section, whereby when a plurality of such sections are arranged in a course in a tank wall, as shown in Figures 1, 2 and 3, the vertical joints between such segments are rendered completely weather proof, an essential attribute in structures of this general type.

The horizontal, or top and bottom edges of each segmental wall section are stepped as best illustrated in Figure 7, to provide co-acting annular interlocking elements 15 and 16, whereby water or moisture engaging the outer periphery of the tank walls can not enter the interior of the tank, as will be clearly understood by reference to Figure 7.

The vertical end edges of each wall section or panel 14 are longitudinally recessed on inside surface of said sections, as shown at 17 and 18 in Figures 4, 5 and 6, thereby to provide a longitudinally extending channel between the contiguous edges of adjacent wall sections 14, indicated by the numeral 19. Recesses 19 extend from the top to the bottom of each course of wall sections. Suitable studs 21 are embedded in the body of each wall section 14, and project outwardly from the end edges thereof, into the longitudinally extending recesses 19 provided between the edges of the adjacent wall sections, as best illustrated in Figures 4 and 5, thereby to facilitate securing the segmental wall sections of each course together, as will subsequently be described.

Another important feature of the invention resides in the means provided in the vertically disposed recesses 19 between adjacent wall sections for inseparably securing together said edges to provide a rigid structure. The means provided for thus securing the vertical edges of adjacent wall sections together is shown comprising a plurality of coupling elements or clips, generally designated by the numeral 22. Each coupling element is shown comprising an elongated wall 23 and spaced parallel end walls 24 and 25, disposed in right angular relation to the wall 22. The coupling elements or clips 22 are thus U-shaped in cross-section, and the overall lengths thereof is slightly less than the distance between the side walls 17 and 18 of the longitudinally extending recesses 19.

The end walls 24 and 25 of each coupling element 22 are provided with downwardly facing open-ended slots 26 and 27, respectively, adapted to receive the projecting threaded terminals of the anchor studs 21, as shown in Figures 4 and 5. When the coupling elements or clips are engaged with the studs 21, suitable nuts 28 are received in threaded engagement with the studs 21, thereby to draw the abutting vertical end edges of adjacent sections tightly together, as indicated at 29 in Figures 1 and 4, to provide leakproof joints, as will be understood. Suitable washers 31 are preferably interposed between the end walls 24 and 25 and the nuts 28, as indicated in Figures 4 and 5.

To further assure the provision of leakproof joints between the vertical end edges of adjacent wall sections, a suitable flashing, generally designated by the numeral 32, is snugly fitted against the bottom of each vertically extending recess 19, between the spaced walls 17 and 18 thereof, as best shown in Figure 4. These flashings or sealing elements are seated against the bottoms of the recesses 19 before the coupling elements 22 are engaged with the studs 21, whereby the coupling elements also serve to retain the flashings in fixed position in the bottoms of the recesses 19. Thus, the vertical joints 29 in each course of segmental wall sections are completely sealed against moisture creeping therethrough into the interior of the tank, as will readily be understood by reference to Figures 4 and 5.

The novel coupling elements herein disclosed have been found to be extremely practical and efficient in actual use, in that they may readily be engaged with the projecting ends of the studs 21 by simply inserting them into the recesses 19 above said studs, and then sliding them downwardly over the studs 21, to the position shown in Figure 5. When the coupling members are so positioned, the nuts 28 may readily be applied to the studs 21 and manipulated to firmly draw the abutting vertical edge portions of adjacent wall sections together, as indicated at 29 in Figure 4, as hereinbefore described.

In actual practice, the separate segmental wall sections 14 may readily be maneuvered into position in the erection of a wall by a suitable hoist or crane of conventional construction. The first course *a* of segmental wall sections may be completely assembled on the foundation 11, as will be understood. The succeeding course *b* is then assembled by elevating each wall section 14 into position upon the top edges of two of the wall sections 14 of the preceding course *a*, it being understood that the vertical joints 29 of one course are preferably disposed in staggered relation to the corresponding joints between the wall segments of a preceding course, as clearly illustrated in Figure 1. Thus, the segmental wall sections of each course $b$ to $i$, inclusive, is completely assembled upon the top edge of a preceding course, and so on, until the composite structure has been completed to the required height.

The over-lapping, or stepped construction of the top and bottom edges of each course of wall sections assures correct placement of the wall sections of each succeeding course upon the preceding course. The interlocking of the top and bottom edges of contiguous courses, in addition to rendering the horizontal joints 30 between courses completely weatherproof, also axially aligns and adequately affixes each succeeding course to the preceding course without the use of additional securing elements, whereby a complete multiple tank structure may be more expeditiously erected, with a resultant reduction in labor and material, and therefore a material reduction in the cost of erecting such a structure.

The longitudinally extending vertical recesses 19 are located at the interior of the wall sections, as hereinbefore stated, whereby the exterior cylindrical surface of the completed tank units present a very neat and finished appearance, as will be understood by reference to Figure 1.

Another feature of the present invention resides in the provision of means whereby the so-called waste spaces present between adjacent tank units, when arranged as shown in Figure 2, may be utilized as additional grain storage bins, thereby to increase the capacity of the composite structure. To thus convert the waste spaces between adjacent tank units into additional grain storage bins, auxiliary wall slabs or sections 33 and 34 are inserted between the peripheries of the tank units A, B, C and D and secured thereto, whereby they become a permanent part of the composite structure.

The wall slabs 33 and 34 are preferably flat, as shown in the drawings, and embedded therein at spaced intervals, vertically, are a plurality of tubular elements 35, which may be constructed of any suitable tubular stock to provide horizontally disposed passages 36 through the lengths of the auxiliary slabs for receiving tie rods or bolts 37, as best shown in Figure 11. The vertical end edges of slabs 33 and 34 are received in shallow recesses 38, provided in the peripheries of the cylindrical walls of the tank units between which the auxiliary wall elements are interposed, as best shown in Figure 10.

Similar tubular elements 39 are embedded in the walls of the segmental wall sections 14 of the cylindrical tank units and are arranged to register with the tubular elements 35 in the auxiliary wall sections 34, whereby said tubular elements 35 and 39 are axially aligned when the wall sections 33 and 34 are fitted into position between the walls of adjacent tank units A, B, C and D. The tie rods 37 may then be inserted through the aligned tubular elements 35 and 39, after which the nuts 41 are engaged with the terminals thereof to firmly draw the vertical edges of the auxiliary wall slabs into engagement with the bottoms of the shallow recesses 38, thereby to secure said slabs in leaktight engagement with the peripheries of their respective tank units, as will be understood by reference to Figures 10 and 11. If necessary, suitable sealing means, not shown in the drawings, may be inserted between the vertical end edges of slabs 33 and 34 and the bottoms of their respective recesses 38.

In some installations it may be deemed desirable to utilize a relatively greater portion of the space between the tank units of a given group of tanks, as shown for example in Figures 9 and 10. To thus further increase the effective storage capacity of a grain installation, other auxiliary wall sections 42 are provided. To facilitate securing the auxiliary wall sections 42 to the peripheries of the cylindrical tank units, the vertical end edge portions 43 of said wall sections are disposed at an angle of approximately forty-five degrees to the plane of the slab, as indicated in Figure 10. The angular relationship between the vertical edge portions of the auxiliary wall sections 42 may be varied to suit conditions. In actual practice, however, it has been found that by angularly arranging the vertical edge portion 43 of the auxiliary wall sections 42, as above described, said wall sections may readily be secured to the peripheries of the walls of the tank units varying considerably in diameter.

Tubular elements 44 and 45 are embedded respectively in the angular edge wall portions 43 of wall slabs 42 and in the walls of the tank units for receiving tie bolts 46 in a manner similar to the tie bolts 37, shown in Figures 10 and 11.

In Figure 13 there is illustrated a sample grain storage bin of angular or square cross-section, composed entirely of flat wall sections or slabs 42, such as shown in Figure 10. When so used, four wall sections 42 are used in each complete course, and they are placed with their vertical end edges abuttingly engaged, as shown in Figure 13. When so positioned, the apertures formed in the abutting end edge portions of adjacent wall sections or slabs 42 are aligned to receive bolts 46, by means of which the wall sections 42 may be rigidly secured together to provide an extremely simple and inexpensive storage bin for bulk grain, and various other materials.

In Figure 12 there is schematically illustrated another arrangement of tank storage bins comprising in combination with the cylindrical tank units A, B, C and D, six additional storage bins made possibly by the embodiment of auxiliary wall sections or slabs 33 and 42 in the composite grain storage structures. In addition to the auxiliary wall sections 33 and 42 intermediate wall sections 47 may be arranged in cross relation, as indicated, thereby to provide six additional grain storage bins indicated by the numerals 48, 49, 51, 52, 53 and 54. Each of said bins is provided at its bottom with a suitable discharge conduit, not shown, for independently conducting the flow of grain from said auxiliary bins to the screw conveyor 8, indicated in Figure 1.

The novel grain storage structure herein disclosed has been found extremely practical and efficient in actual operation. Its simple and inexpensive construction, and the fact that all of the concrete parts thereof may be precast and carried in stock for immediate delivery, has made it possible to erect a composite grain storage structure such as illustrated in Figure 1, at a relatively lower cost than has been possible in the past.

The segmental wall sections 14 are of sufficient length horizontally so that they may be placed on their bottom edges without danger of tipping over, and they may also be nested, one within another to, take up minimum storage space. The interlocking of the horizontal edges of the segmental wall sections 14, as shown in Figure 7, in addition to providing leaktight joints between the various courses, also greatly facilitates the erection of the structure, in that each segmental slab section may readily be placed on the top edge of the slabs of a preceding course, the overlapping wall portions 15 and 16 vertically aligning each succeeding wall segment with the wall sections of the preceding course.

As each individual segmental wall section 14 is elevated into position on the top edge of a preceding course of wall sections, one of its end edges is brought into abutting engagement with the vertical end edge of a previously placed wall segment, and a coupling element 22 may then be slid into interlocking engagement with the projecting ends of the studs 21, as will be understood by reference to Figures 4 and 5. Thus a series of segmental wall sections 14 may be successively placed on the top edge of each preceding course of wall sections to complete the next following course, and when their end edges are secured together by coupling elements 22, as hereinbefore described, the complete course becomes self-supporting, and another course of wall sections 14 may then be erected, and so on until the tank unit has attained its desired height. Each succeeding course will remain in position on the preceding course without the use of additional securing elements, the overlapping wall portions 15 and 16 eliminating any possible danger of one course relatively shifting upon another course.

The sealing elements or flashings 32 are seated against the bottoms of the recesses 19 in which the coupling elements 22 are located, and each such sealing element extends from the top to the bottom of the vertical recesses 19 in which it is seated. Each sealing element is initially retained in position in its respective recess 19 by coupling elements 22. When grain is subsequently introduced into the tank unit, such grain will engage the sealing elements 32 and firmly press them into sealing engagement with the bottoms of the vertical recesses 19, whereby the vertical joints 29 between adjacent wall segments are positively sealed against leakage of moisture from the exterior of the structure.

The segmental wall sections 14 are preferably arranged in staggered relation as shown in Figure 1 whereby the interlocking of the horizontal top and bottom edges of adjacent portions of wall sections become so firmly interlocked with one another that they can not relatively shift their positions with respect to one another, and also whereby the completed grain storage structure is capable of resisting severe storms, as will readily be understood by reference to the application drawings.

Grain storage tanks or bins, as is well known, may vary considerably in capacity, depending upon their location. Such variations may be taken care of by utilizing tank units of different diameters and heights, and by varying the number of tank units embodied in each installation. To attain maximum economy in the erection of a grain storage structure, such as herein disclosed, it is highly desirable to select certain predetermined tank diameters, as for example fourteen, sixteen and twenty feet. Such tank diameters require different size segmental wall sections, but by standardizing the available tank diameters, the segmental wall sections may be similarly standardized for such tank diameters. Thus, by standardizing the tank diameters as above, the segmental wall sections may be pre-cast in large quantities at very low cost, whereby they may readily be carried in stock for immediate delivery.

The coupling elements 22 for securing together the vertical end edges of the segmental wall sections 14 of each course of such sections, are identical in construction for all tank diameters, whereby they, too, may be fabricated in large quantities at extremely low cost.

In grain storage installations in which it is desired to utilize the waste spaces between the peripheries of adjacent tank units for additional storage bins, as indicated in Figures 2, 9, 10 and 12, certain segmental tank sections must be provided with vertically extending recesses 38 for receiving the vertical end edges of the auxiliary wall slabs 33, 34 and 42, as will be understood by reference to Figures 10 and 11, thereby to provide leak-proof joints between said parts, as hereinbefore described.

The foregoing detailed description has been given for clearness of understanding only, and no unnecessary limitations should be understood therefrom, and the appended claims should be construed as broadly as permissible in view of the prior art.

I claim as my invention:

1. In a concrete grain storage structure comprising a plurality of superimposed courses of independent segmental wall sections, the vertical end edges of each wall section being abuttingly engaged with the vertical end edges of adjacent wall sections in each course of wall sections, the vertical end edges of each wall section having its inner corners recessed the height of the wall section whereby a longitudinally extending inwardly facing channel is provided between the vertical edges of contiguous wall sections, each of said channels being defined by a circumferentially disposed wall portion and laterally spaced vertical wall portions, horizontally disposed tie studs embedded in the laterally spaced vertical wall portions of each longitudinally extending channel, each of said studs having a threaded end portion projecting into its respective channel, U-shaped coupling members received in said channels and each comprising an elongated wall and spaced parallel end walls, the elongated walls of said coupling members being seated against the circumferential wall portions of said channels, the end walls of said coupling members each having a downwardly facing open ended slot therein adapted to receive the projecting threaded end portions of said studs, and securing elements received in threaded engagement with the projecting end portions of said studs and with the end walls of said coupling members, whereby manipulation of said securing elements will draw the abutting vertical edges of said segmental wall sections firmly into engagement with one another.

2. A grain storage structure according to claim 1, wherein sheet metal flashings are interposed between the elongated wall portions of said U-shaped coupling members and the bottom walls of said channels, thereby to seal the vertical joints between contiguous wall sections against the elements.

References Cited in the file of this patent

UNITED STATES PATENTS

| | | |
|---|---|---|
| 742,873 | Jamieson | Nov. 3, 1903 |
| 1,147,015 | Gray | July 20, 1915 |
| 1,245,417 | Leonard | Jan. 22, 1918 |
| 2,321,873 | Tate | June 15, 1943 |

FOREIGN PATENTS

| | | |
|---|---|---|
| 580,960 | Great Britain | Sept. 26, 1946 |
| 387,591 | France | May 9, 1908 |
| 692,984 | France | Nov. 13, 1930 |
| 708,735 | France | May 4, 1931 |
| 62,396 | France | June 14, 1955 |
| 242,780 | Switzerland | Nov. 1, 1946 |